(12) United States Patent
Rivera et al.

(10) Patent No.: US 9,581,163 B2
(45) Date of Patent: Feb. 28, 2017

(54) AIR DIFFUSER SYSTEMS, METHODS, AND APPARATUSES

(71) Applicant: The Boeing Company, Seal Beach, CA (US)

(72) Inventors: Manuel F. Rivera, Puyallup, WA (US); Herbert Louis Hoffman, Seattle, WA (US); Matthew Trudeau, Renton, WA (US)

(73) Assignee: The Boeing Company, Chicago, IL (US)

( * ) Notice: Subject to any disclaimer, the term of this patent is extended or adjusted under 35 U.S.C. 154(b) by 659 days.

(21) Appl. No.: 14/010,775

(22) Filed: Aug. 27, 2013

(65) Prior Publication Data
US 2015/0063995 A1    Mar. 5, 2015

(51) Int. Cl.
*F04D 3/00* (2006.01)
*B64D 13/06* (2006.01)

(52) U.S. Cl.
CPC ............... *F04D 3/00* (2013.01); *B64D 13/06* (2013.01); *B64D 2013/0625* (2013.01); *Y02T 50/44* (2013.01); *Y02T 50/56* (2013.01)

(58) Field of Classification Search
CPC . F05D 3/00; Y02T 50/44; Y02T 50/56; B64D 13/06; B64D 13/065
USPC ................... 454/71, 206, 207, 262
See application file for complete search history.

(56) References Cited

U.S. PATENT DOCUMENTS

| | | | | |
|---|---|---|---|---|
| 2,820,406 A | * | 1/1958 | Argentieri | F24F 11/025 181/256 |
| 3,059,564 A | * | 10/1962 | Curran | F24F 3/0522 181/224 |
| 3,687,054 A | * | 8/1972 | Boberg | B64D 13/00 454/76 |
| 4,896,588 A | * | 1/1990 | Monda | B64D 13/00 181/225 |
| 5,209,259 A | * | 5/1993 | Dear | F16K 47/08 137/561 A |
| 5,929,396 A | * | 7/1999 | Awad | F17C 7/00 181/211 |
| 6,413,159 B1 | * | 7/2002 | Bates, III | B64D 13/00 454/301 |
| 6,920,959 B2 | | 7/2005 | Han et al. | |

(Continued)

FOREIGN PATENT DOCUMENTS

| | | |
|---|---|---|
| GB | 893999 | 4/1962 |
| JP | 62 228831 | 10/1987 |

OTHER PUBLICATIONS

English translation of abstract of JP 62 228831.

*Primary Examiner* — Gregory Huson
*Assistant Examiner* — Dana Tighe
(74) *Attorney, Agent, or Firm* — DASCENZO Intellectual Property Law, P.C.

(57) ABSTRACT

Aircraft, air conditioning systems, and air diffusers that may be used to create a quiet, comfortable environment within an aircraft cabin are disclosed. The systems and apparatuses are configured to flow air at a rate that meets and/or exceeds the FAA minimum requirement of 0.55 lbs/min (about 250 g/min) per occupant. In use, even at higher flow rates, the systems and apparatuses are configured to create a quiet cabin experience, by contributing little to ambient cabin noise. Thus, the systems and apparatuses may be used to provide fresh air at a comfortable rate and a comfortable noise level.

24 Claims, 4 Drawing Sheets

(56) References Cited

U.S. PATENT DOCUMENTS

| | | |
|---|---|---|
| 7,100,356 B2 | 9/2006 | Han et al. |
| 7,802,651 B2 | 9/2010 | Park et al. |
| 2007/0157803 A1* | 7/2007 | McNeil .................. B01D 53/22 95/45 |
| 2010/0154468 A1 | 6/2010 | Shaska et al. |
| 2011/0294409 A1 | 12/2011 | Edom et al. |
| 2012/0118408 A1* | 5/2012 | Holmgren .............. B64D 13/00 137/560 |
| 2013/0327891 A1* | 12/2013 | Zhang .................... B64D 13/08 244/118.5 |

* cited by examiner

AIR DIFFUSER SYSTEMS, METHODS, AND APPARATUSES

FIELD

The present disclosure relates to air diffuser systems, methods, and apparatuses.

BACKGROUND

Many aircraft are designed to fly at high altitudes, e.g., from 10,000 feet (about 3,000 m) to upwards of 41,000 feet (about 12,500 m), while providing a safe, comfortable cabin environment. To maintain this cabin environment, a typical aircraft includes an air conditioning system, with appropriate pressure, temperature, and moisture regulation, to circulate fresh air within the passenger cabin. An aircraft air conditioning system is sometimes referred to as an air conditioning pack, an air handling system, and/or an air circulation system. An air conditioning system may circulate outside air mixed with an approximately equal amount of highly filtered air from the passenger cabin. The combined outside and filtered air is ducted to the cabin and distributed to cabin outlets throughout the cabin, typically louvers, air distribution rails, vents, and personal air outlets (e.g., eyeball gaspers above passenger seating). Air diffusers direct the ducted air into the cabin outlets.

Inside the cabin, air diffusers and outlets are generally arranged along the side walls of the cabin and sometimes along the overhead. The air flows in generally circular patterns and exits through grilles, often on either side of the cabin floor, and, on airplanes with overhead recirculation, the air may exit through overhead grilles. For commercial aircraft, the FAA requires a minimum air flow and cabin pressure. For new aircraft, the minimum air flow is 0.55 lbs/min per occupant (about 250 g/min (grams per minute) per occupant) and the minimum cabin pressure is 0.75 bar (75 kPa).

The cabin air flow is continuous and is used for maintaining a comfortable cabin temperature, pressurization, and/or overall air quality. About half of the air exiting the cabin is exhausted from the airplane through one or more outflow valves in the fuselage, which also controls the cabin pressure. The other half is drawn through high efficiency filters, and then is recirculated with fresh outside air.

SUMMARY

Aircraft, air conditioning systems, and air diffusers of the present disclosure may be used to create a quiet, comfortable environment within an aircraft cabin. The systems and apparatuses may be configured to flow air at or above the FAA minimum requirement of 0.55 lbs/min per occupant (about 250 g/min per occupant) while producing a low noise level.

Aircraft and air conditioning systems may comprise a plurality of air diffusers to supply air to the aircraft cabin. Each air diffuser, and associated air handling components, may add weight and/or complexity to an aircraft. Hence, an aircraft may be designed to minimize the number of required air diffusers (thus saving weight and, ultimately, fuel and maintenance costs). Since an aircraft is rated for a certain number of occupants, including crew and passengers, a smaller number of air diffusers necessitates that each air diffuser handle a larger volume of air such that at least the minimum flow is achieved. Because of the low noise design of the air diffusers of the present disclosure, the aircraft may comprise less than one air diffuser for every two rated occupants.

Quiet aircraft cabin air diffusers, as presently disclosed, comprise an inlet section to receive air flow, an outlet section to discharge air flow into an aircraft cabin, a neck section to direct air flow from the inlet section to the outlet section, an orifice plate to regulate flow and to create backpressure at the inlet, and a baffle, downstream of the orifice plate, to spread flow evenly across the lateral width of the outlet. The inlet section, the neck section, and the outlet section are operatively coupled to direct air flow from the inlet section to the outlet section.

The air diffusers are configured to achieve a low noise signature at higher flow rates. Noise generated by use of the air diffusers may be less than other ambient cabin noise and/or may contribute little to the ambient cabin noise.

The inlet section, the neck section, and the outlet section each generally define a smooth air flow path. The air flow is modified by the orifice plate, which generally includes a plurality of orifices, and the baffle, which generally defines an open area near the neck section and/or the outlet section. The baffle may be one or more of several configurations. For example, the baffle may be a baffle plate arranged to define a gap, and/or the baffle may be a flow straightener plate with a row of apertures.

DESCRIPTION

Figure 1:
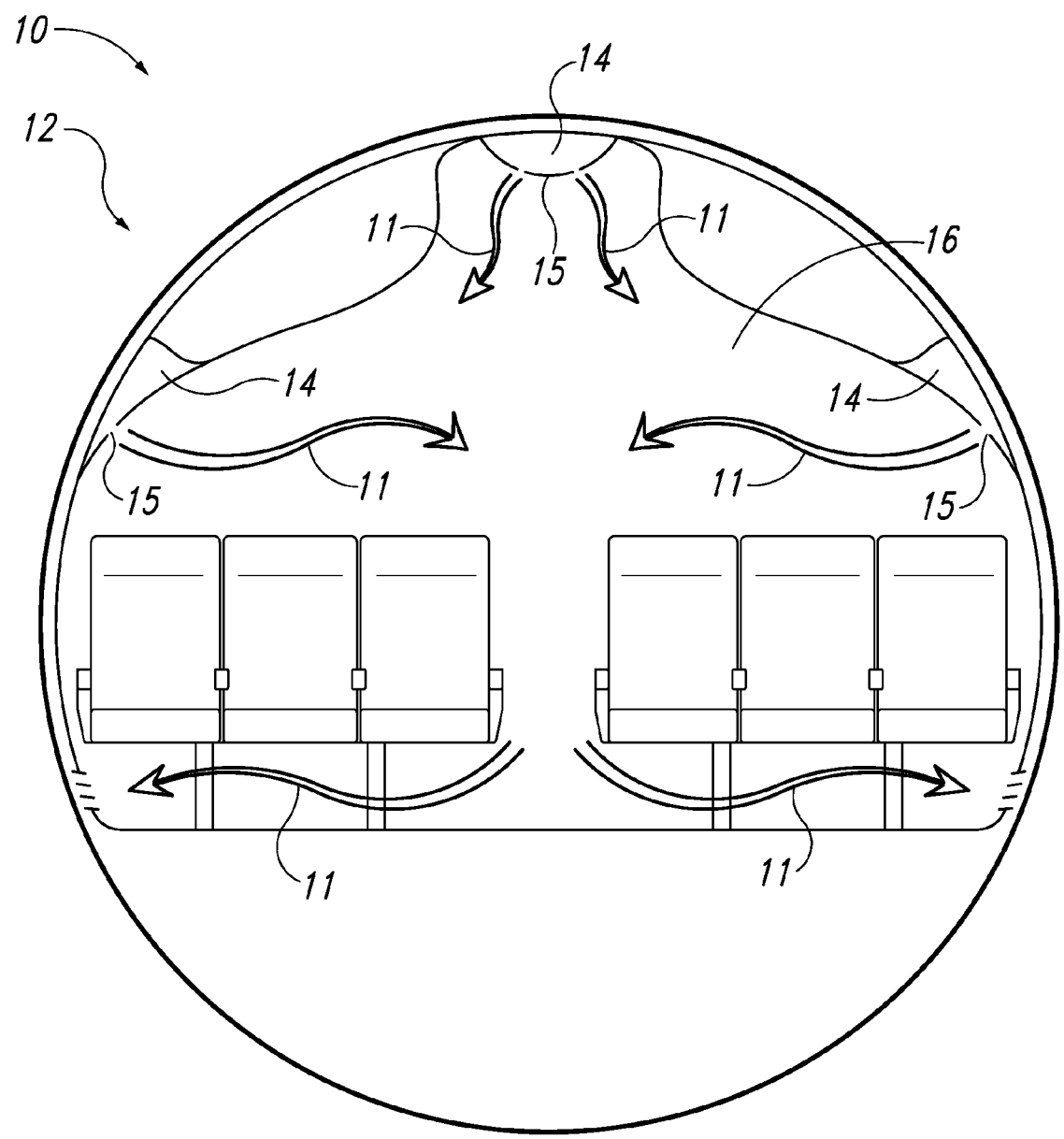
FIG. 1 is a cross-sectional schematic representation of an aircraft interior.
Figure 2:
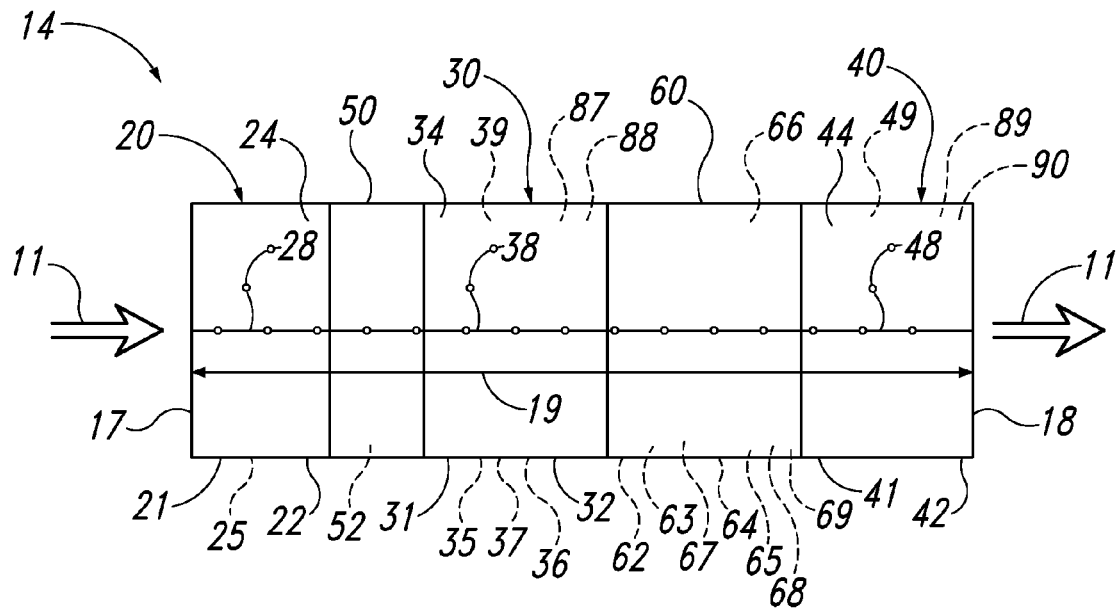
FIG. 2 is a schematic representation of an illustrative, non-exclusive example air diffuser.
Figure 3:
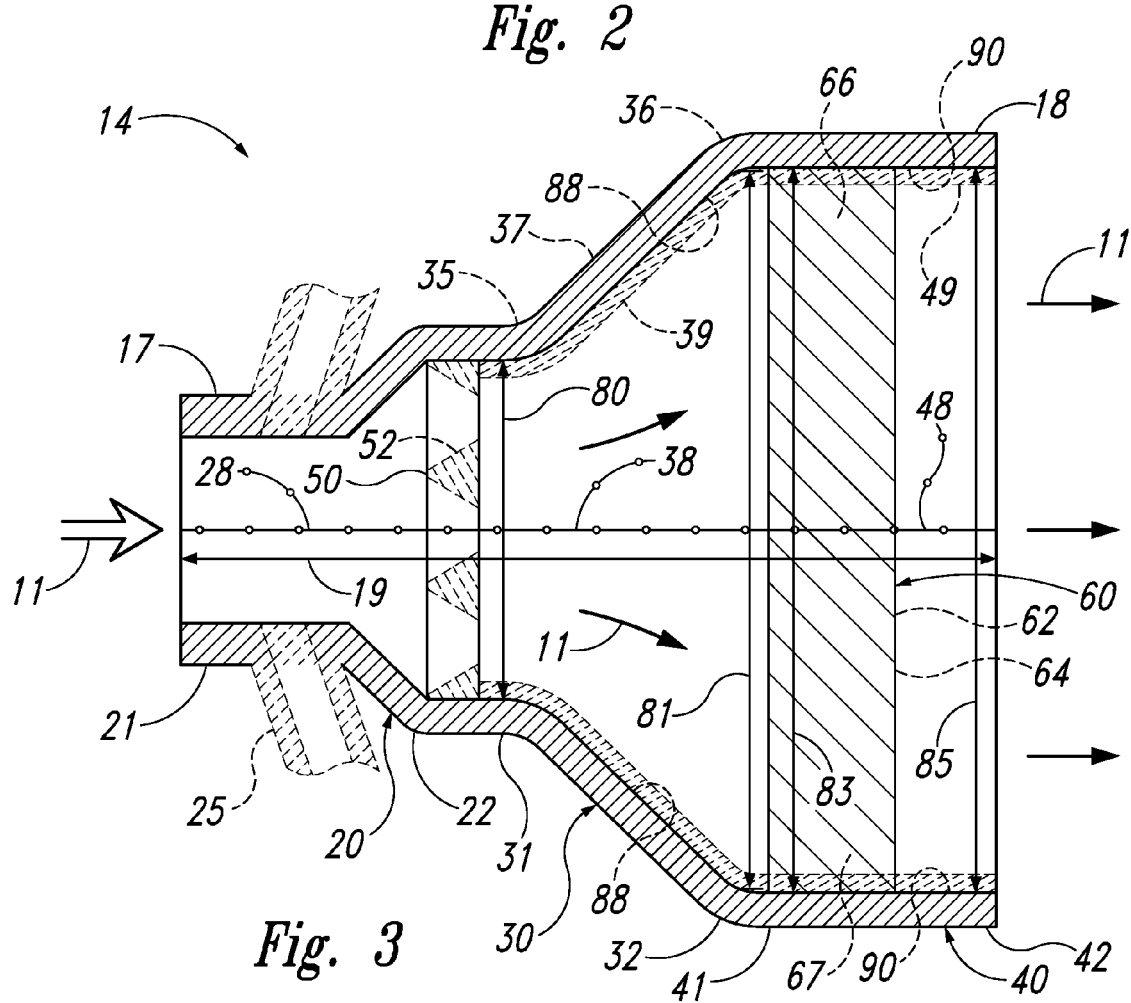
FIG. 3 is a longitudinal cross-sectional view, perpendicular to the transverse axis, of an illustrative, non-exclusive example air diffuser.

The present disclosure relates to systems, methods, and apparatuses for diffusing air within an aircraft. FIG. 1 is a cross-sectional schematic representation of an aircraft interior illustrating where and how an air diffuser 14 may be employed within an aircraft 10 to circulate air in an aircraft cabin 16. Air flow is indicated by arrows 11. Air diffusers 14 are typically part of an air conditioning system 12, sometimes referred to as an air conditioning pack, on board the aircraft 10. The air conditioning system 12 circulates air within the aircraft cabin 16 by providing air flow to air diffusers 14 fluidically coupled to the aircraft cabin 16. The air may flow into the aircraft cabin 16 through cabin air vents 15, typically along the side walls, above the stow bins, and/or the overhead of the aircraft cabin 16. Further, the air conditioning system 12 may supply air to passenger-controlled gaspers, generally above each seat.

An aircraft 10 may be configured to transport one or more passengers, including crew. For example, commercial aircraft may be configured to transport up to several hundred passengers. Several air diffusers 14, and any associated cabin air vents 15, may be distributed along the aircraft cabin 16 to provide relatively uniform flow of fresh air to all occupants.

Air diffusers 14 may be configured to fit within the space constraints of an aircraft 10 and/or aircraft cabin 16. Typically, an air conditioning system 12 has ducts running along the length of the aircraft 10 fuselage, often near the stow bins and the overhead in commercial transport aircraft 10. Air diffusers 14 may be connected to the ducts along the fuselage and may redirect some of the air flowing in the ducts into the aircraft cabin 16. To accommodate this type of air flow within the space constraints, air diffusers 14 may be generally compact and/or curved.

FIGS. 2-8 are various views of air diffusers 14. Where appropriate, the reference numerals from the schematic illustrations of FIG. 2-8 are used to designate corresponding components of aircraft 10, air conditioning systems 12, and/or air diffusers 14; however, the examples of FIGS. 2-8 are non-exclusive and do not limit aircraft 10, air conditioning systems 12 and/or air diffusers 14 to the illustrated embodiments of FIGS. 2-8. That is, aircraft 10, air conditioning systems 12 and/or air diffusers 14 are not limited to the specific embodiments represented in FIGS. 2-8, and aircraft 10, air conditioning systems 12 and/or air diffusers 14 may incorporate any number of the various aspects, configurations, characteristics, properties, etc. that are illustrated in and discussed with reference to the schematic representations of FIGS. 1-8, as well as variations thereof, without requiring the inclusion of all such aspects, configurations, characteristics, properties, etc.

Air diffusers 14 of the present disclosure generally comprise an inlet section 20, proximate to an air diffuser upstream end 17, an outlet section 40, proximate to an air diffuser downstream end 18, and a neck section 30 that spans between the inlet section 20 and the outlet section 40. Each of these sections, and the air diffuser 14 as a whole, has an open interior, or a channel, to allow air to flow through the section and air diffuser 14. Hence, the sections, and the air diffuser 14, may be described as being hollow, defining a cavity, defining an open volume, and/or being porous. Each of the sections is operatively connected to the neighboring sections such that air may flow into the inlet section 20 at an inlet upstream end 21, through the neck section 30, and out the outlet section 40 at an outlet downstream end 42. The sections may each be composed of one or more parts. Two or more sections may share component parts. For example, one monolithic piece may include an inlet section 20, a neck section 30, and an outlet section 40. As another example, the inlet section may be one piece, the neck section may be a second piece, and the outlet section may be a third piece of an air diffuser 14 assembly.

Generally each section has an upstream end (the end configured to receive air flow) and a downstream end (the end configured to emit air flow). The inlet upstream end 21 is proximate to the air diffuser upstream end 17, the end where air flow 11 is configured to enter the air diffuser 14. The outlet downstream end 42 is proximate to the air diffuser downstream end 18, the end where air flow 11 is configured to exit the air diffuser 14. The inlet section 20 at the inlet downstream end 22 is operatively coupled to the neck section 30 at the neck upstream end 31. The neck section 30 at the neck downstream end 32 is operatively coupled to the outlet section 40 at the outlet upstream end 41.

Air diffusers 14 also comprise an orifice plate 50 and a baffle 60 within the air flow path of the air diffuser 14, generally at least partially in the interior of one or more of the inlet section 20, the neck section 30, and the outlet section 40. The orifice plate 50 is generally located toward the air diffuser upstream end 17. The baffle 60 is located downstream of the orifice plate 50, and hence is generally toward the air diffuser downstream end 18.

Air diffusers 14 are configured to supply air as part of an air conditioning system 12 at a rate to maintain the comfort and health of occupants. FAA regulations currently require a minimum air flow of 0.55 lbs/min per occupant (about 250 g/min per occupant). When flying, aircraft with pressurized cabins typically maintain the air pressure at the equivalent of about 6,000-8,000 ft. altitude (about 1,800-2,400 m), which is about 0.75-0.80 bar (about 75-80 kPa). At 75 kPa and a comfortable cabin temperature of about 20-25° C., the FAA requirement corresponds to about 10 cubic feet per minute per occupant (about 280 l/min per occupant). An aircraft 10 and/or an air conditioning system 12 may incorporate more than one air diffuser 14 to handle the required air flow and/or to distribute the air flow relatively equally among the occupants. Each air diffuser 14, and associated air handling components, adds weight and complexity to an aircraft 10. Hence, an aircraft 10 may be designed to minimize the number of required air diffusers 14 (thus saving weight and, ultimately, fuel and maintenance costs). Since an aircraft 10 is rated for a certain number of occupants, including crew and passengers, a smaller number of air diffusers 14 necessitates that each air diffuser 14 handle a larger volume of air such that at least the minimum flow is achieved. The aircraft 10 may incorporate less than one air diffuser 14 for every two rated occupants, for every three rated occupants, and/or for every four rated occupants. For example, the aircraft 10 may include less than 0.5, less than 0.4, less than 0.37, less than 0.33, less than 0.30, less than 0.28, less than 0.26, less than 0.24, less than 0.22, less than 0.2, about 0.4, about 0.37, about 0.33, about 0.3, about 0.25, and/or about 0.22 air diffusers per rated occupant. Air diffusers 14 may be configured to handle air flow of about the required rate or greater. For example, air diffusers 14 may be configured to flow air at greater than 700 g/min, greater than 800 g/min, greater than 900 g/min, greater than 1,000 g/min, greater than 1,100 g/min, greater than 1,200 g/min, less than 1,500 g/min, less than 1,200 g/min, 800-1,200 g/min, greater than 800 l/min, greater than 900 l/min, greater than 1,000 l/min, greater than 1,100 l/min, greater than 1,200 l/min, greater than 1,300 l/min, less than 1,500 l/min, less than 1,300 l/min, and/or 900 1,300 l/min.

An air diffuser 14 may be employed in an aircraft 10 and/or an air conditioning system 12 to circulate air in an aircraft cabin 16. Circulating may include supplying air to an aircraft cabin 16 through the air diffuser 14. The air diffusers 14 may be configured to supply the aircraft cabin 16 with a generally uniform air flow and/or an air flow of at least 250 g/min per rated occupant. Further, circulating may include maintaining an air pressure in an aircraft cabin 16 sufficient for safe, comfortable travel. For example, the pressure may be greater than about 60 kPa, greater than 70 kPa, greater than 75 kPa, greater than 80 kPa, greater than 90 kPa, greater than 100 kPa, less than 120 kPa, less than 100 kPa, less than 80 kPa, 70-80 kPa, 70-90 kPa, about 80 kPa, and/or about 75 kPa.

Air diffusers 14 may be configured and/or used to establish a relatively quiet aircraft cabin environment by creating a sound level not substantially more than other ambient noise in an aircraft cabin 16, at least at some frequencies that interfere with speech and/or at high frequencies. At higher flow rates, conventional air conditioning systems may make aircraft cabins noisy. However, the air diffusers 14 of the present disclosure may be configured to provide quiet air flow, even at high flow rates, without compromising the typical space and weight constraints of conventional air diffusers. Aircraft cabins 16 may have many noise sources, particularly when the aircraft 10 is flying. Air diffusers 14 may be configured to contribute little to the overall sound level in an aircraft cabin 16. The sound level from an air diffuser 14 in use may be less than 20 dB, less than 10 dB, less than 5 dB, less than 3 dB, less than 2 dB, or less than 1 dB more than other ambient noise in aircraft cabin 16, at least at particular frequencies. For example, the sound level contribution may include frequencies of 1 kHz, 2 kHz, 3 kHz, 4 kHz, 5 kHz, 8 kHz, 10 kHz, 12 kHz, 15 kHz, 20 kHz, 1-4 kHz, 2-4 kHz, 3-10 kHz, 5-10 kHz, greater than 5 kHz, and/or greater than 8 kHz. An alternate measure of interfering sound level is the speech interference level (SIL). The SIL is the arithmetic mean of the sound levels of a noise at four bands with center frequencies of 0.5 kHz, 1 kHz, 2 kHz, and 4 kHz. These bands contain the frequencies that are most important for speech communication. The SIL of an air diffuser 14 in use may be less than 55 dB, less than 52 dB, less than 50 dB, less than 48 dB, less than 46 dB, or less than 44 dB.

Air diffusers 14 are three dimensional objects which may be oriented in a variety of ways. To facilitate discussion of features, structures, and components of air diffusers 14, this disclosure makes reference to three orthogonal directions: a longitudinal direction, a lateral direction, and a transverse direction. The longitudinal direction is a direction generally along the direction of air flow, spanning the air diffuser 14 from the air diffuser upstream end 17 to the air diffuser downstream end 18. The lateral direction is orthogonal to the longitudinal direction and generally traverses the widest portion of the air flow channel within the air diffuser 14. A dimension of the air diffuser 14 along the lateral direction is referred to as a lateral width. The transverse direction is orthogonal to both the longitudinal direction and the lateral direction. A dimension of the air diffuser 14 along the transverse direction is referred to as a transverse breadth.

Air diffusers 14 may be characterized by an air channel length 19, the length of the geometrical center of the air flow path from the air diffuser upstream end 17 to the air diffuser downstream end 18. Further, air diffusers 14 may be characterized by a characteristic dimension measured perpendicular to the longitudinal direction, for example a lateral width, a transverse breath, a diameter and/or an effective diameter.

The inlet section 20 of an air diffuser 14 is located proximate to the air diffuser upstream end 17 and may be located at the air diffuser upstream end 17. The inlet section 20 generally is configured to create a diverging flow, i.e., the inlet section 20 defines an air flow path that is substantially diverging. However, the inlet section 20 may be configured to create a generally straight flow, i.e., the inlet section 20 defines an air flow path that is substantially straight. In one configuration to create a generally diverging air flow path, the inlet upstream end 21 is smaller than the inlet downstream end 22. Specifically, the inlet section 20 may define an open area, the total cross-sectional area that may allow a fluid to pass, that is smaller at the inlet upstream end 21 than at the inlet downstream end 22.

Generally, the inlet section 20 may be tubular, hollow, and/or define an open volume. The inlet section 20 may be a tube, a generally cylindrical shell, and/or a generally tapered shell. The interior profile (the shape of the cross section of the interior) at the inlet upstream end 21 and/or at the inlet downstream end 22 may be substantially round and/or substantially oval.

The inlet section 20 may be characterized by an inlet central axis 28 between the inlet upstream end 21 and the inlet downstream end 22. A central axis is a line that traverses the geometric centroid of each cross section perpendicular to the longitudinal dimension of an object. The central axis generally extends along the longitudinal direction and generally follows the contour of the object. In the inlet section 20, the inlet central axis 28 generally describes the unobstructed flow of air through the inlet section 20. The inlet central axis 28 is typically a substantially straight line between the center of the inlet upstream end 21 and the inlet downstream end 22. Between the inlet upstream end 21 and the inlet downstream end 22, and generally along the inlet central axis 28, the inlet section 20 may be elongated.

The inlet section 20 may be configured to direct some air flow away from the outlet section 40 of the air diffuser 14. Such flow may be directed to gaspers and/or other components of the air conditioning system 12. Flow may be directed away from the outlet section 40 by including one or more branching tubes 25 along the inlet section 20, as best viewed in FIGS. 3 and 5.

Returning to the broader discussion of FIGS. 2-8, the neck section 30 of an air diffuser 14 is generally a transition section between the inlet section 20 and the outlet section 40. The neck section 30 may include a neck first region 35, proximate to the neck upstream end 31, a neck second region 36, proximate to the neck downstream end 32, and/or a neck transition region 37 between the neck upstream end 31 and the neck downstream end 32. The neck first region 35 and/or the neck upstream end 31 may be configured to couple, and/or be operatively coupled, to the inlet downstream end 22. The neck second region 36 and/or the neck downstream end 32 may be configured to couple, and/or be operatively coupled, to the outlet upstream end 41.

The neck section 30 may be characterized by a neck central axis 38 between the neck upstream end 31 and the neck downstream end 32. The neck central axis 38 generally describes the unobstructed flow of air through the neck section 30. Generally, the neck central axis 38 is continuous with the inlet central axis 28. The neck central axis 38 may be a substantially straight line or may be a substantially curved line between the center of the neck upstream end 31 and the neck downstream end 32. Between the neck upstream end 31 and the neck downstream end 32, and generally along the neck central axis 38, the neck section 30 may be elongated.

Generally, the neck section 30 may be tubular, hollow, and/or define an open volume. The neck section 30 may be a tube, a generally cylindrical shell, and/or generally an open box. For example, the neck first region 35 may be a tube and/or a generally cylindrical shell. As another example, the neck second region 36 may be a tube and/or generally an open box. The interior profile at the neck upstream end 31 may be substantially round and/or substantially oval. The interior profile at the neck downstream end 32 may be substantially round, substantially oval, substantially oblong, and/or substantially rectangular. Generally, the interior profile at the neck upstream end 31 is different than the interior profile at the neck downstream end 32. Where the profiles differ, the interior profile at the neck downstream end 32 may be larger in one direction (e.g., the lateral direction) and smaller in a perpendicular direction (e.g., the transverse direction) than the interior profile at the neck upstream end 31. The open area at the neck upstream end 31 may be smaller than the open area at the neck downstream end 32. Even where the interior profiles differ, the open area at the neck upstream end 31 may be the same as the open area at the neck downstream end 32. The neck transition region 37, when present, has a non-uniform interior profile, an interior profile that changes along the neck central axis 38.

The interior of the neck section 30 at the neck upstream end 31 may be characterized by a characteristic dimension that is a lateral width, a transverse breadth, a diameter, and/or an effective diameter. The interior of the neck section 30 at the neck downstream end 32 may have a lateral width 81 that is larger than a characteristic dimension 80 of the interior of the neck section 30 at the neck upstream end 31, as best viewed in FIG. 3. The ratio of the characteristic dimension 80 to the lateral width 81 may be less than 50%, less than 40%, less than 30%, less than 25%, less than 20%, less than 15%, less than 12%, less than 10%, less than 8%, 8-50%, 8-25%, about 20%, about 15%, and/or about 12%. The interior of the neck section 30 at the neck downstream end 32 may have a transverse breadth 82 that is about equal to or smaller than the characteristic dimension 80 of the interior of the neck section 30 at the neck upstream end 31, as best viewed in FIG. 4. The ratio of the transverse breadth 82 to the characteristic dimension 80 may be less than 120%, less than 100%, less than 80%, less than 60%, less than 50%, less than 40%, less than 30%, less than 25%, less than 20%, 20-100%, 30-50%, about 100%, about 50%, about 33%, and/or about 25%. The lateral width 81 may be larger than the transverse breadth 82. The ratio of the transverse breadth 82 to the lateral width 81 may be less than 50%, less than 40%, less than 30%, less than 25%, less than 20%, less than 15%, less than 12%, less than 10%, less than 8%, less than 7%, less than 6%, less than 5%, less than 4%, 4-40%, 5-25%, 10-25%, about 25%, about 20%, about 15%, and/or about 12%. The characteristic dimension 80 of the interior of the neck section 30 at the neck upstream end 31 may be greater than 20 mm, greater than 30 mm, greater than 40 mm, greater than 50 mm, greater than 60 mm, greater than 80 mm, greater than 100 mm, less than 100 mm, less than 80 mm, less than 60 mm, less than 50 mm, 30-100 mm, and/or 40-60 mm. The lateral width 81 may be greater than 100 mm, greater than 200 mm, greater than 300 mm, greater than 400 mm, greater than 500 mm, less than 500 mm, less than 400 mm, less than 300 mm, less than 200 mm, 100-500 mm, 200-300 mm, and/or about 280 mm. The lateral width 81 may be substantially the same as or less than the length of the neck central axis 38.

Returning to the broader discussion of FIGS. 2-8, the neck section 30 generally defines a smooth air flow path, roughly following the neck central axis 38, from the neck upstream end 31 to the neck downstream end 32. The air flow path may be substantially straight or substantially curved. Generally, the neck section 30 is configured to direct air entering the neck upstream end 31 into a different direction upon exiting the neck downstream end 32. The air flow path may be characterized by the central axis of the air flow. Where the air flow path is curved, the air flow central axis may have a compound curvature, including bends and/or twists in multiple directions. For example, the plane of principal curvature may be substantially orthogonal to the lateral direction, e.g., the direction along the lateral width 81 of the interior of the neck section 30 at the neck downstream end 32.

Within the interior, the neck section 30 generally has a smooth interior profile. Where the interior profile changes, such as along the neck transition region 37, the interior may have few to no features that could cause significant turbulence and/or undesired turbulence. For example, the interior of the neck section 30 may have arcuate surfaces, rounded corners, no sharp corners, and/or be essentially free of sharp corners.

The neck section 30 may include neck sound dampening material 39 to reduce noise generated by air flow through the air diffuser 14. The neck sound dampening material 39 may include a material and/or structure that attenuates, reflects, and/or redirects sound, at least at particular frequencies. The neck sound dampening material 39 may be essentially free of volatile substances and/or particulates that may circulate with the air flow. The neck sound dampening material 39 may be essentially fire resistant and/or resist formation of smoke, vapors, and/or particulate. For example, the neck sound dampening material may include aramid fibers, e.g., products sold under the trade names NOMEX, Kevlar, Twaron, and Technora. Generally, the neck sound dampening material 39 is located along the interior surface(s) of the neck section 30 and may be directly or indirectly coupled to an interior surface of the neck section 30. The neck sound dampening material 39 may be composed of a continuous section of material and/or a patchwork of material sections. The neck sound dampening material 39 may cover all, substantially all, most, and/or a majority of the interior of the neck section 30. For example, the neck sound dampening material 39 may cover greater than 20%, greater than 40% greater than 50%, greater than 60%, greater than 75%, greater than 90%, about 50%, about 75%, or about 100% of the interior of the neck section 30. The neck section 30 may be completely free or selectively free of neck sound dampening material 39. For example, where the interior of the neck section 30 generally has a transverse surface 88 and a lateral surface 87 (as best viewed in FIGS. 3 and 4 respectively), the lateral surface 87 may be substantially covered by neck sound dampening material 39 and/or the transverse surface 88 may be substantially free of neck sound dampening material 39.

Returning to the broader discussion of FIGS. 2-8, the outlet section 40 of an air diffuser 14 is located proximate to the air diffuser downstream end 18 and may be located at the air diffuser downstream end 18. The outlet section 40 generally is configured to create a broad, uniform flow at the outlet downstream end 42.

The outlet section 40 may be characterized by an outlet central axis 48 between the outlet upstream end 41 and the outlet downstream end 42. The outlet central axis 48 generally describes the unobstructed flow of air through the outlet section 40. Generally, the outlet central axis 48 is continuous with the neck central axis 38. The outlet central axis 48 may be a substantially straight line or may be a substantially curved line between the center of the outlet upstream end 41 and the outlet downstream end 42. Between the outlet upstream end 41 and the outlet downstream end 42, and generally along the outlet central axis 48, the outlet section 40 may be elongated.

Generally, the outlet section 40 may be tubular, hollow, and/or define an open volume. The outlet section 40 may be a tube, generally an open box, and/or generally an open tapered box. The interior profile at the outlet upstream end 41 and/or the outlet downstream end 42 may be substantially round, substantially oval, substantially oblong, and/or substantially rectangular.

Figure 4:
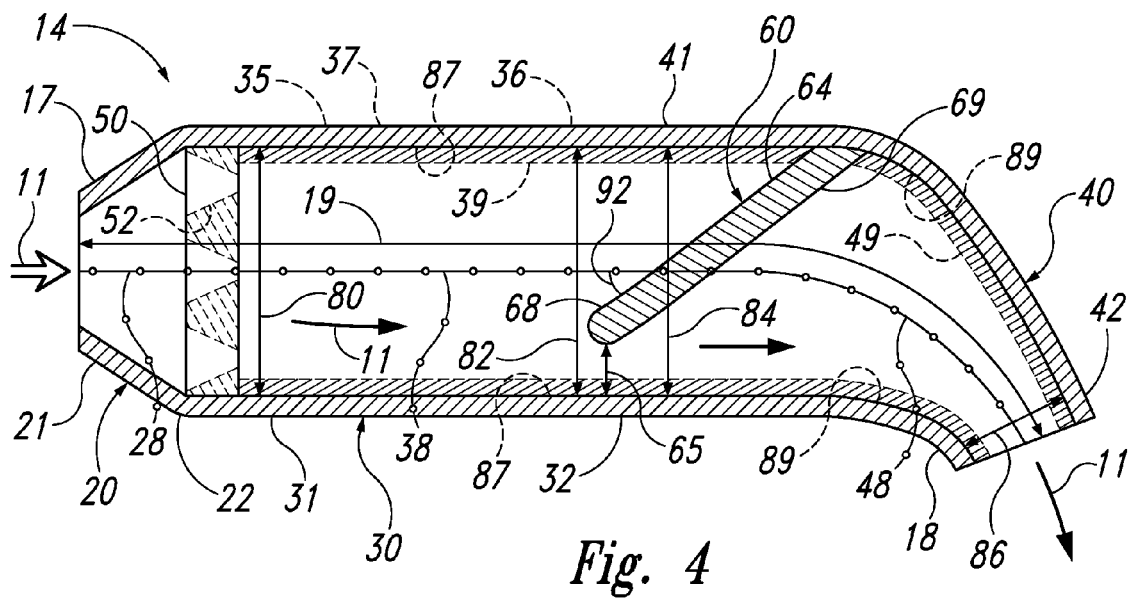
FIG. 4 is a longitudinal cross-sectional view, perpendicular to the lateral axis, of an illustrative, non-exclusive example air diffuser.
Figure 5:
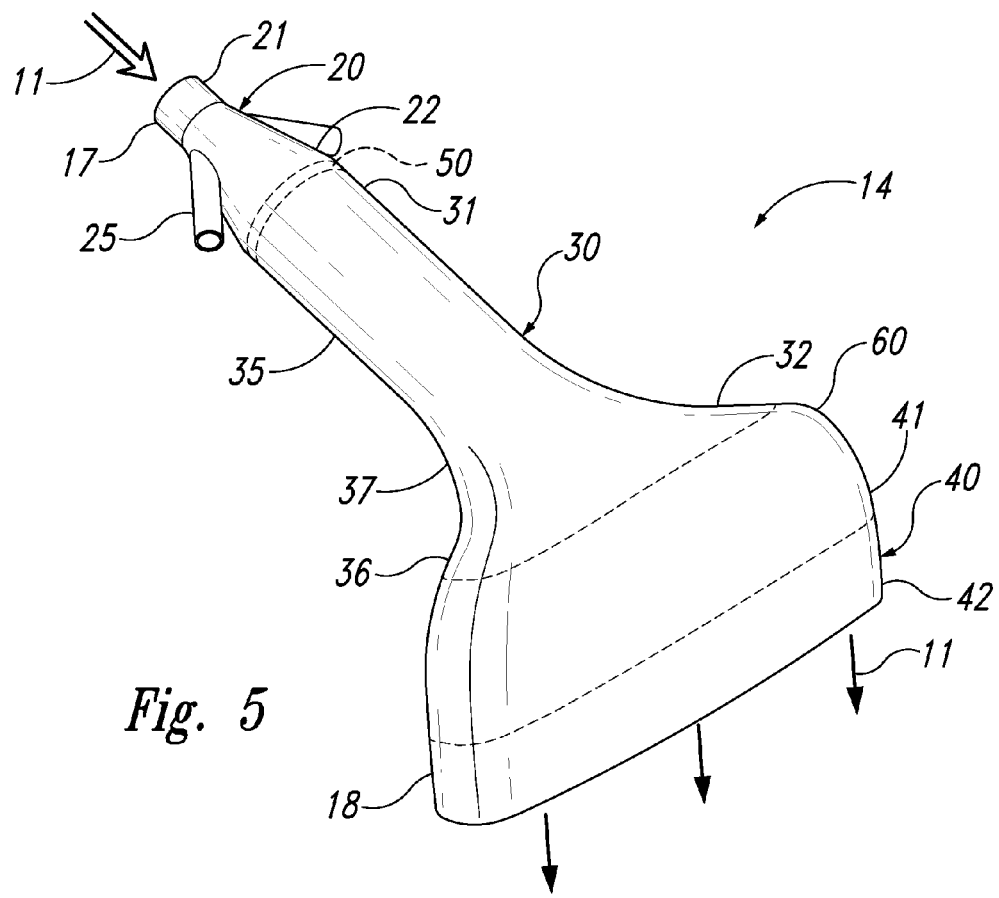
FIG. 5 is a perspective view of an illustrative, non-exclusive example air diffuser.
Figure 6:
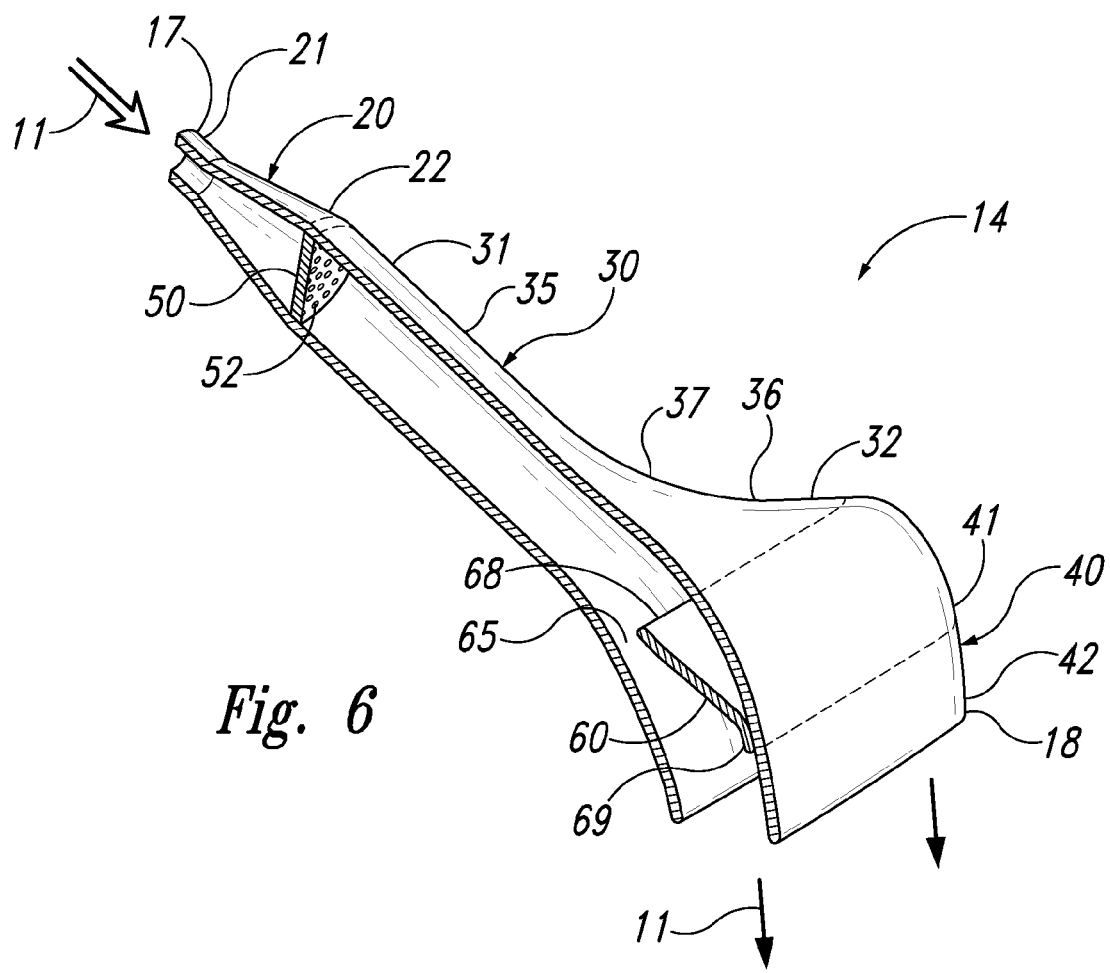
FIG. 6 is a cutaway view, showing a longitudinal cross section perpendicular to the lateral axis, of an illustrative, non-exclusive example air diffuser.
Figures 7, 8:
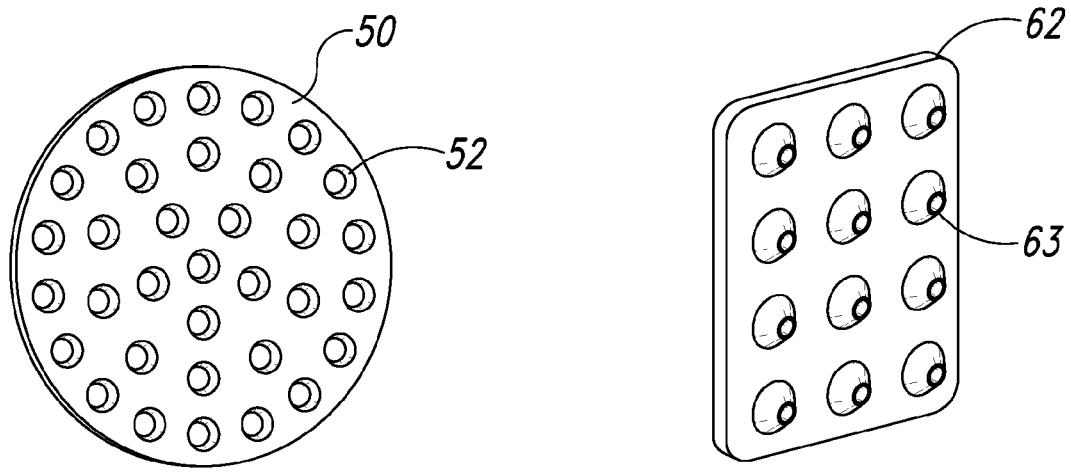
FIG. 7 is a perspective view of an illustrative, non-exclusive example orifice plate.
FIG. 8 is a perspective view of an illustrative, non-exclusive example flow straightener.

The interior of the outlet section 40 at the outlet upstream end 41 may be non-cylindrically symmetric and may have a lateral width 83 (as best view in FIG. 3) that is larger than the transverse breadth 84 (as best viewed in FIG. 4). Similarly, the interior of the outlet section 40 at the outlet downstream end 42 may be non-cylindrically symmetric and may have a lateral width 85 (as best viewed in FIG. 3) that is larger than the transverse breadth 86 (as best viewed in FIG. 4). The ratio of the transverse breadth 84 at the outlet upstream end 41 to the lateral width 83 at the outlet upstream end 41 may be less than 50%, less than 40%, less than 30%, less than 25%, less than 20%, less than 15%, less than 12%, less than 10%, less than 8%, less than 7%, less than 6%, less than 5%, less than 4%, 4-40%, 5-25%, 10-25%, about 25%, about 20%, about 15%, and/or about 12%. The ratio of the transverse breadth 86 at the outlet downstream end 42 to the lateral width 85 at the outlet downstream end 42 may be less than 50%, less than 40%, less than 30%, less than 25%, less than 20%, less than 15%, less than 12%, less than 10%, less than 8%, less than 7%, less than 6%, less than 5%, less than 4%, 4-40%, 5-25%, 10-25%, about 25%, about 20%, about 15%, and/or about 12%. The lateral width 83 at the outlet upstream end 41 and/or the lateral width 85 at the outlet downstream end 42 may be greater than 100 mm, greater than 200 mm, greater than 300 mm, greater than 400 mm, greater than 500 mm, less than 500 mm, less than 400 mm, less than 300 mm, less than 200 mm, 100-500 mm, 200-300 mm, and/or about 280 mm. The lateral width 83 at the outlet upstream end 41 is generally about the same as the lateral width 85 at the outlet downstream end 42. The transverse breadth 84 at the outlet upstream end 41 and/or the transverse breadth 86 at the outlet downstream end 42 may be greater than 10 mm, greater than 20 mm, greater than 30 mm, greater than 40 mm, greater than 50 mm, greater than 70 mm, greater than 100 mm, greater than 150 mm, less than 200 mm, less than 150 mm, less than 100 mm, less than 70 mm, less than 50 mm, less than 40 mm, less than 30 mm, less than 20 mm, 10-200 mm, 20-100 mm, 20-70 mm, about 20 mm, and/or about 50 mm. The transverse breadth 84 at the outlet upstream end 41 is generally greater than and/or about equal to the transverse breadth 86 at the outlet downstream end 42. The length of the outlet central axis 48 may be less than 80%, less than 60%, less than 50%, less than 40%, less than 30%, less than 25%, less than 20%, 20-80%, 25-60%, about 60%, about 50%, and/or about 40% of the lateral width 85 at the outlet downstream end 42.

The outlet section 40 generally defines an air flow path, roughly following the outlet central axis 48, from the outlet upstream end 41 to the outlet downstream end 42. The air flow path may be substantially straight or substantially curved. Generally, the outlet section 40 may be configured to direct air entering the outlet upstream end 41 into a different direction upon exiting the outlet downstream end 42. The air flow path may be characterized by the central axis of the air flow. Where the air flow path is curved, the air flow central axis may have a compound curvature, including bends and/or twists in multiple directions. For example, the plane of principal curvature may be substantially orthogonal to the lateral direction, e.g., the direction along the lateral width 83 of the interior of the outlet section 40 at the outlet upstream end 41.

The air flow may converge within the outlet section 40. In one configuration to create a generally converging air flow path, the outlet upstream end 41 is larger than the outlet downstream end 42. Specifically, the outlet section may have an open area at the outlet upstream end 41 that is larger than the open area at the outlet downstream end 41.

The outlet section 40 may include outlet sound dampening material 49 to reduce noise generated by air flow through the air diffuser 14. The outlet sound dampening material 49 may be the same material as optional neck sound dampening material 39, may have similar characteristics as the optional neck sound dampening material 39, and/or may be continuous with the optional neck sound dampening material 39. Generally, the outlet sound dampening material 49 is located along the interior surface(s) of the outlet section 40 and may be directly or indirectly coupled to an interior surface of the outlet section 40. The outlet sound dampening material 49 may be composed of a continuous section of material and/or a patchwork of material sections. The outlet sound dampening material 49 may cover all, substantially all, most, and/or a majority of the interior of the outlet section 40. For example, the outlet sound dampening material 49 may cover greater than 20%, greater than 40% greater than 50%, greater than 60%, greater than 75%, greater than 90%, about 50%, about 75%, or about 100% of the interior of the outlet section 40. The outlet section 40 may be completely free or selectively free of outlet sound dampening material 49. For example, where the interior of the outlet section 40 generally has a transverse surface 90 and a lateral surface 89 (as best viewed in FIGS. 3 and 4 respectively), the lateral surface 89 may be substantially covered by outlet sound dampening material 49 and/or the transverse surface 90 may be substantially free of outlet sound dampening material 49.

Returning to the broader discussion of FIGS. 2-8, the air diffuser 14 also comprises an orifice plate 50, which is located generally in the interior of air diffuser 14, typically within the inlet section 20, the neck section 30, and/or the interface between the inlet section 20 and the neck section 30. The orifice plate 50 may be proximate to the inlet downstream end 22 and the neck upstream end 31. Further, the orifice plate 50 may be configured to couple, and/or be operatively coupled, to the inlet section 20 and/or the neck section 30. Generally, the orifice plate 50 is substantially perpendicular to the inlet central axis 28 and/or the neck central axis 38.

The orifice plate 50 may be configured to create flow resistance, thereby regulating the total flow of air within, and/or into, the air diffuser 14. The flow resistance is generally across the orifice plate 50 and hence the orifice plate 50 may be configured to restrict air flow from the inlet upstream end 21 to one or more of the inlet downstream end 22, the neck downstream end 32, and the outlet downstream end 42. Additionally or alternatively, the orifice plate 50 may be configured to create backpressure at the inlet upstream end 21. The back pressure may be used to regulate and/or restrict air flow through the air diffuser 14 and/or may be used to direct air flow through auxiliary air conditioning system components, e.g., through optional branching tube 25 (which may ultimately direct air to personal air outlets, e.g., gaspers). Where the inlet section 20 defines a diverging air flow path, the expansion of the air flow volume upstream of the orifice plate may increase the static air pressure in that region (relative to no expansion). The static pressure may be used to direct air flow through auxiliary air conditioning system components.

Generally, the orifice plate 50 partially transmits air impinging on its surface. For example, the orifice plate may have an open area of less than 50%, less than 40%, less than 30%, less than 20%, less than 10%, greater than 5%, greater than 10%, greater than 20%, greater than 30%, 5-50%, and/or 20-40%.

The orifice plate 50 may define a plurality of orifices 52 to allow air to pass through the plate. The orifice plate 50 may have greater than 5, greater than 10, greater than 20, greater than 30, 5-50, 10-30, less than 50, and/or less than 30 orifices 52. Generally, the number of orifices 52 and the open area of the orifice plate 50 are configured to restrict the air flow and/or to create back pressure across the orifice plate 50. The area of each orifice 52 may be the same or different. For example, all orifices 52 may have the same area, or orifices further from the inlet central axis 28 and/or the neck central axis 38 may be smaller than orifices located near the inlet central axis 28 and/or the neck central axis 38. Each orifice 52 may independently have a non-uniform profile across the thickness of the orifice plate 50. For example, an orifice 52 may be chamfered, tapered, or rounded. When an orifice 52 has a non-uniform profile with a larger end and a smaller end, noise from the orifice plate 50 may be reduced by generally arranging the profile such that the larger end faces the upstream side of the air diffuser 14, i.e., towards the inlet upstream end 21, and the smaller end faces the downstream side of the air diffuser 14, i.e., towards the neck downstream end 32 and/or the outlet downstream end 42. For example, an orifice plate 50 with a plurality of uniformly chamfered orifices 52 may be placed such that the chamfered sides of the orifices 52 face the upstream air flow, i.e., the inlet upstream end 21.

Generally the orifice plate 50 is configured to fit within the air diffuser 14, typically within the inlet section 20 and/or the neck section 30, the orifice plate 50 having a profile substantially the same as the interior of the nearby section. The orifice plate 50 may have a characteristic dimension, i.e., a lateral width, a transverse breadth, a diameter, and/or an effective diameter, that is greater than 30 mm, greater than 40 mm, greater than 50 mm, greater than 60 mm, greater than 80 mm, greater than 100 mm, less than 100 mm, less than 80 mm, less than 60 mm, less than 50 mm, 30-100 mm, and/or 40-60 mm. The orifice plate 50 may have a thickness that is less than 8 mm, less than 6 mm, less than 4 mm, less than 3 mm, less than 2 mm, greater than 1 mm, greater than 2 mm, greater than 3 mm, greater than 4 mm, 1-8 mm, and/or 2-4 mm.

The air diffuser 14 also comprises a baffle 60, which is located generally in the interior of air diffuser 14, typically within the neck section 30, the outlet section 40, and/or the interface between the neck section 30 and the outlet section 40. The baffle 60 may be proximate to the neck downstream end 32 and the outlet upstream end 41. Further, the baffle 60 may be configured to couple, and/or be operatively coupled, to the neck section 30 and/or the outlet section 40.

Generally, the baffle 60 is substantially perpendicular to or oblique to, the neck central axis 38 and/or the outlet central axis 48. The relationship between the baffle 60 and the neck central axis 38 and/or the outlet central axis 48 may be characterized by an angle 92, as best viewed in FIG. 4. The angle 92 between the baffle 60 and the neck central axis 38 and/or between the baffle 60 and the outlet central axis 48 is greater than 10°, greater than 15°, greater than 20°, greater than 25°, greater than 30°, greater than 35°, greater than 40°, greater than 45°, greater than 50°, greater than 55°, greater than 60°, greater than 65°, greater than 70°, greater than 75°, greater than 85°, less than 90°, less than 75°, less than 70°, less than 65°, less than 60°, less than 55°, less than 50°, less than 45°, less than 40°, less than 35°, less than 30°, less than 25°, less than 20°, less than 15°, 10°-50°, 15°-45°, 20°-45°, 25°-35°, about 90°, about 75°, about 60°, about 45°, about 30°, and/or about 15°.

The baffle 60 may be configured to create flow resistance and/or create backpressure within the air diffuser 14. The flow resistance is generally between the neck upstream end 31 and the outlet downstream end 42. The backpressure is generally backpressure at the neck upstream end 31. Generally, the baffle 60 may be configured to spread air flow across the lateral width 85 of the outlet section 40 at the outlet downstream end 42. One configuration, which may spread the air flow and maintain a quiet air flow, includes a tortuous air flow path from the neck upstream end 31 to the outlet downstream end 42. Generally, the flow restriction of the baffle 60 prevents direct transmission of upstream noise and redirects the air flow to interact with the interior of the neck section, the interior of the outlet section, the optional neck sound dampening material 39, and/or the optional outlet sound dampening material 49.

The baffle 60 may be a baffle plate 64 characterized by a first end 66, a second end 67. The baffle plate 64 may substantially span the lateral width 81 of the interior of the neck section 30 at the neck downstream end 32 and/or the lateral width 83 of the interior of the outlet section 40 at the outlet upstream end 41. Additionally or alternatively, the baffle plate 64 may substantially span the interior of the neck section 30 and/or the outlet section 40 across the lateral direction. The baffle plate 60 may be substantially flat, may include flat regions, curved regions, and/or rounded regions.

Generally, the baffle plate 64 is configured to substantially restrict air flow near the first end 66 and/or the second end 67. For example, the first end 66 and/or the second end 67 may be coupled close to one or more interior surfaces of the neck section 30 and/or the outlet section 40, for example the transverse surface 88 of the interior of the neck section 30 and/or the transverse surface 90 of the interior of the outlet section 40. Where the first end 66 and/or the second 67 are near an interior surface of the air diffuser 14, the interior surface may include sound dampening material, e.g., neck sound dampening material 39 and outlet sound dampening material 49, or may be essentially free of sound dampening material proximate the first end 66 and/or the second end 67. Where the neck section 30 includes sound dampening material 39, the neck sound dampening material 39 may define a material gap near the first end 66 and/or the second end 67, e.g., along a transverse surface 88 of the interior of the neck section 30. Where the outlet section 40 includes sound dampening material 49, the outlet sound dampening material 49 may define a material gap near the first end 66 and/or the second end 67, e.g., along a transverse surface 90 of the interior of the outlet section 40.

Generally, the baffle plate 64 defines one or more gaps 65 between the baffle plate 64 and the interior of the neck section 30 and/or the outlet section 40. The gap 65 may substantially span the interior of the neck section 30 and/or the outlet section 40 across the lateral direction, in which case the gap 65 would be between the baffle plate 64 and a lateral surface 87 of the interior of the neck section 30 and/or a lateral surface 89 of the interior of the outlet section 40. The gap 65 may have a lateral width approximately the same as the lateral width 81 at the neck downstream end 32 and/or the lateral width 83 at the outlet upstream end 41. The gap 65 may have an open area that is less than 50%, less than 40%, less than 35%, less than 30%, less than 25%, less than 20%, less than 15%, less than 12%, less than 10%, less than 8%, greater than 5%, greater than 8%, greater than 10%, greater than 12%, greater than 15%, greater than 20%, greater than 25%, greater than 30%, greater than 35%, greater than 40%, 5-50%, 8-30%, 8-20%, 10-35%, about 8%, about 10%, about 12%, about 15%, about 20%, about 25%, about 30%, and/or about 33% of the open area of the outlet downstream end 42. The interior surface of the neck section 30 and/or the outlet section 40 near the gap 65 may be substantially flat near the gap 65, may have a curvature away from the baffle plate 64, and/or may have a curvature toward the baffle plate 64.

The baffle plate 64 may have a third end 68 near the gap 65 and fourth end 69 opposite the third end 68. The third end

68 may be configured to smoothly split air flow and may be wedge-shaped, rounded and/or bulbous. The third end 68 may be upstream or downstream of the fourth end 69. The fourth end 69 is generally near the interior surface of the neck section 30 and/or the outlet section 40, and may be operatively coupled to the neck section 30 and/or the outlet section 40. For example, the fourth end 69 may be near a lateral surface 87 of the interior of the neck section 30 and/or near a lateral surface 89 of the interior of the outlet section 40. Further, the baffle plate 64, may define a dead volume, a volume where air may enter and exit essentially from one direction, between the fourth end 69 and the interior surface of the neck section 30 and/or the interior surface of the outlet section 40.

Additionally or alternatively, the baffle 60 may be a flow straightener plate 62. The flow straightener plate 62 generally has one or more rows of apertures 63, e.g., three rows. The rows generally span the lateral direction of the flow straightener plate 62. Each aperture 63 independently has a characteristic dimension, e.g., a lateral width, a transverse breadth, a diameter, and/or an effective diameter. The apertures 63 may all have substantially the same characteristic dimensions or may have different characteristic dimensions. The flow straightener plate 62 may be a thick plate and/or may have protrusions further defining the apertures 63. The apertures 63 may each independently traverse the flow straightener plate 62, including any protrusions, at an angle that is perpendicular or oblique to the local plane of the flow straightener plate 62. For example, an aperture 63 may traverse the flow straightener plate 62 at an angle of about 90°, about 75°, about 60°, about 45°, about 30°, or about 15°. All apertures 63 may traverse the flow straightener plate 62 at essentially the same angle.

Illustrative, non-exclusive examples of inventive subject matter according to the present disclosure are described in the following enumerated paragraphs:

A1. A quiet aircraft cabin air diffuser comprising:
an inlet section with an open interior, an inlet upstream end, and an inlet downstream end;
a neck section with an open interior, a neck upstream end, and a neck downstream end, wherein the inlet downstream end is operatively coupled to the neck upstream end;
an outlet section with an open interior, an outlet upstream end and an outlet downstream end, wherein the neck downstream end is operatively coupled to the outlet upstream end;
an interior orifice plate; and
an interior baffle that is downstream of the interior orifice plate.

A2. The air diffuser of paragraph A1, wherein the inlet section has an open area at the inlet upstream end that is smaller than an open area at the inlet downstream end.

A3. The air diffuser of any of paragraphs A1-A2, wherein the inlet section is a tube, a generally cylindrical shell, and/or a generally tapered shell.

A4. The air diffuser of any of paragraphs A1-A3, wherein the inlet section has an interior profile at the inlet upstream end and/or at the inlet downstream end that is substantially round and/or substantially oval.

A5. The air diffuser of any of paragraphs A1-A4, wherein the inlet section is elongated between the inlet upstream end and the inlet downstream end.

A6. The air diffuser of any of paragraphs A1-A5, wherein the inlet section has an inlet central axis between the inlet upstream end and the inlet downstream end, optionally wherein the inlet central axis is substantially straight.

A7. The air diffuser of any of paragraphs A1-A6, wherein the interior of the inlet section defines an air flow path that is substantially straight and/or substantially diverging.

A8. The air diffuser of any of paragraphs A1-A7, wherein the inlet section includes a branching tube configured to create an air flow path directed away from the inlet downstream end.

A9. The air diffuser of any of paragraphs A1-A8, wherein the neck section has a first region, proximate to the neck upstream end, that is a tube and/or a generally cylindrical shell.

A10. The air diffuser of any of paragraphs A1-A9, wherein the neck section has a second region, proximate to the neck downstream end, that is a tube and/or generally an open box.

A11. The air diffuser of any of paragraphs A1-A10, wherein the neck section has a transition region between the neck upstream end and the neck downstream end, wherein the transition region has a non-uniform interior profile, optionally wherein the interior of the transition region defines a smooth air flow path, has arcuate surfaces, has rounded corners, has no sharp corners, and/or is essentially free of sharp corners.

A12. The air diffuser of any of paragraphs A1-A11, wherein the neck section at the neck upstream end has an interior profile that is substantially round and/or substantially oval.

A13. The air diffuser of any of paragraphs A1-A12, wherein the neck section at the neck downstream end has an interior profile that is substantially round, substantially oval, substantially oblong, and/or substantially rectangular.

A14. The air diffuser of any of paragraphs A1-A13, wherein the neck section has a first interior profile at the neck upstream end and a second interior profile at the neck downstream end, wherein the first interior profile and the second interior profile are different.

A15. The air diffuser of any of paragraphs A1-A14, wherein the neck section is elongated between the neck upstream end and the neck downstream end.

A16. The air diffuser of any of paragraphs A1-A15, wherein the neck section has a neck central axis between the neck upstream end and the neck downstream end, optionally wherein the neck central axis is substantially straight or substantially curved, and optionally wherein the neck central axis is continuous with the/an inlet central axis.

A17. The air diffuser of any of paragraphs A1-A16, wherein the interior of the neck section defines a substantially straight aft flow path.

A18. The air diffuser of any of paragraphs A1-A17, wherein the interior of the neck section defines a substantially curved air flow path.

A18.1. The air diffuser of paragraph A18, wherein a plane of principal curvature of the air flow path is substantially orthogonal to a lateral width of the interior of the neck section at the neck downstream end.

A19. The air diffuser of any of paragraphs A1-A18.1, wherein the neck section is configured to direct air entering the neck upstream end into a different direction upon exiting the neck downstream end.

A20. The air diffuser of any of paragraphs A1-A19, wherein the neck section includes a neck sound dampening material, optionally wherein the neck sound dampening material includes fire resistant materials and/or aramid fibers.

A20.1. The air diffuser of paragraph A20, wherein the neck sound dampening material is coupled to an interior surface of the neck section.

A20.2. The air diffuser of any of paragraphs A20-A20.1, wherein the neck sound dampening material is continuous within the neck section.

A20.3. The air diffuser of any of paragraphs A20-A20.2, wherein the neck sound dampening material covers most, a majority and/or substantially all, of the interior of the neck section.

A20.4. The air diffuser of any of paragraphs A20-A20.3, wherein the neck sound dampening material covers a fraction of the interior of the neck section, and wherein the fraction is greater than 20%, greater than 40% greater than 50%, greater than 60%, greater than 75%, greater than 90%, about 50%, about 75%, or about 100%.

A20.5. The air diffuser of any of paragraphs A20-A20.4, wherein the interior of the neck section at the neck downstream end has a lateral surface and a transverse surface, wherein the lateral surface is substantially covered by neck sound dampening material, and optionally wherein the transverse surface is substantially free of neck sound dampening material.

A21. The air diffuser of any of paragraphs A1-A20.5, wherein the neck section has an open area at the neck upstream end that is smaller than an open area at the neck downstream end.

A22. The air diffuser of any of paragraphs A1-A21, wherein the interior of the neck section at the neck downstream end has a lateral width that is larger than a characteristic dimension of the interior of the neck section at the neck upstream end, wherein the characteristic dimension is a lateral width, a transverse breadth, a diameter, and/or an effective diameter, and optionally wherein the ratio of the characteristic dimension to the lateral width is less than 50%, less than 40%, less than 30%, less than 25%, less than 20%, less than 15%, less than 12%, less than 10%, less than 8%, 8-50%, 8-25%, about 20%, about 15%, and/or about 12%.

A23. The air diffuser of any of paragraphs A1-A22, wherein the interior of the neck section at the neck downstream end has a transverse breadth that is about equal to or smaller than a characteristic dimension of the interior of the neck section at the neck upstream end, wherein the characteristic dimension is a lateral width, a transverse breadth, a diameter, and/or an effective diameter, optionally wherein the ratio of the transverse breadth to the characteristic dimension is less than 120%, less than 100%, less than 80%, less than 60%, less than 50%, less than 40%, less than 30%, less than 25%, less than 20%, 20-100%, 30-50%, about 100%, about 50%, about 33%, and/or about 25%.

A24. The air diffuser of any of paragraphs A1-A23, wherein the interior of the neck section at the neck downstream end has a lateral width and a transverse breadth, wherein the lateral width is larger than the transverse breadth, and optionally wherein the ratio of the transverse breadth to the lateral width is less than 50%, less than 40%, less than 30%, less than 25%, less than 20%, less than 15%, less than 12%, less than 10%, less than 8%, less than 7%, less than 6%, less than 5%, less than 4%, 4-40%, 5-25%, 10-25%, about 25%, about 20%, about 15%, and/or about 12%.

A25. The air diffuser of any of paragraphs A1-A24, wherein a characteristic dimension of the interior of the neck section at the neck upstream end is greater than 20 mm, greater than 30 mm, greater than 40 mm, greater than 50 mm, greater than 60 mm, greater than 80 mm, greater than 100 mm, less than 100 mm, less than 80 mm, less than 60 mm, less than 50 mm, 30-100 mm, and/or 40-60 mm, and wherein the characteristic dimension is a lateral width, a transverse breadth, a diameter, and/or an effective diameter.

A26. The air diffuser of any of paragraphs A1-A25, wherein a lateral width of the interior of the neck section at the neck downstream end is greater than 100 mm, greater than 200 mm, greater than 300 mm, greater than 400 mm, greater than 500 mm, less than 500 mm, less than 400 mm, less than 300 mm, less than 200 mm, 100-500 mm, 200-300 mm, and/or about 280 mm.

A27. The air diffuser of any of paragraphs A1-A26, wherein a lateral width of the interior of the neck section at the neck downstream end is substantially the same as or less than a length of the/a neck central axis.

A28. The air diffuser of any of paragraphs A1-A27, wherein the outlet section is a tube, generally an open box, and/or generally an open tapered box.

A29. The air diffuser of any of paragraphs A1-A28, wherein the outlet section has an interior profile at the outlet upstream end and/or at the outlet downstream end that is substantially round, substantially oval, substantially oblong, and/or substantially rectangular.

A30. The air diffuser of any of paragraphs A1-A29, wherein the outlet section is elongated between the outlet upstream end and the outlet downstream end.

A31. The air diffuser of any of paragraphs A1-A30, wherein the outlet section has an outlet central axis between the outlet upstream end and the outlet downstream end, optionally wherein the outlet central axis is substantially straight or substantially curved, and optionally wherein the outlet central axis is continuous with the/a neck central axis.

A32. The air diffuser of any of paragraphs A1-A31, wherein the interior of the outlet section defines an air flow path that is substantially straight and/or substantially converging.

A33. The air diffuser of any of paragraphs A1-A32, wherein the interior of the outlet section defines a substantially curved air flow path.

A33.1. The air diffuser of paragraph A33, wherein a plane of principal curvature of the air flow path is substantially orthogonal to a lateral width of the interior of the outlet section at the outlet upstream end.

A34. The air diffuser of any of paragraphs A1-A33.1, wherein the outlet section is configured to direct air entering the outlet upstream end into a different direction upon exiting the outlet downstream end.

A35. The air diffuser of any of paragraphs A1-A34, wherein the outlet section includes an outlet sound dampening material, optionally wherein the outlet sound dampening material includes fire resistant materials and/or aramid fibers.

A35.1. The air diffuser of paragraph A35, wherein the outlet sound dampening material is coupled to an interior surface of the outlet section.

A35.2. The air diffuser of any of paragraphs A35-A35.1, wherein the outlet sound dampening material is continuous within the outlet section.

A35.3. The air diffuser of any of paragraphs A35-A35.2, wherein the outlet sound dampening material covers most, a majority and/or substantially all, of the interior of the outlet section.

A35.4. The air diffuser of any of paragraphs A35-A35.3, wherein the outlet sound dampening material covers a fraction of the interior of the outlet section, and wherein the fraction is greater than 20%, greater than 40% greater than 50%, greater than 60%, greater than 75%, greater than 90%, about 50%, about 75%, or about 100%.

A35.5. The air diffuser of any of paragraphs A35-A35.4, wherein the interior of the outlet section at the outlet upstream end has a lateral surface and a transverse surface, wherein the lateral surface is substantially covered by outlet sound dampening material, and optionally wherein the transverse surface is substantially free of outlet sound dampening material.

A36. The air diffuser of any of paragraphs A1-A35.5, wherein the outlet section has an open area at the outlet upstream end that is larger than an open area at the outlet downstream end.

A37. The air diffuser of any of paragraphs A1-A36, wherein the interior of the outlet section at the outlet upstream end has a lateral width and a transverse breadth, wherein the lateral width is larger than the transverse breadth, and optionally wherein the ratio of the transverse breadth to the lateral width is less than 50%, less than 40%, less than 30%, less than 25%, less than 20%, less than 15%, less than 12%, less than 10%, less than 8%, less than 7%, less than 6%, less than 5%, less than 4%, 4-40%, 5-25%, 10-25%, about 25%, about 20%, about 15%, and/or about 12%.

A38. The air diffuser of any of paragraphs A1-A37, wherein a lateral width of the interior of the outlet section at the outlet upstream end is greater than 100 mm, greater than 200 mm, greater than 300 mm, greater than 400 mm, greater than 500 mm, less than 500 mm, less than 400 mm, less than 300 mm, less than 200 mm, 100-500 mm, 200-300 mm, and/or about 280 mm.

A39. The air diffuser of any of paragraphs A1-A38, wherein a transverse breadth of the interior of the outlet section at the outlet upstream end is greater than 10 mm, greater than 20 mm, greater than 30 mm, greater than 40 mm, greater than 50 mm, greater than 70 mm, greater than 100 mm, greater than 150 mm, less than 200 mm, less than 150 mm, less than 100 mm, less than 70 mm, less than 50 mm, less than 40 mm, less than 30 mm, less than 20 mm, 10-200 mm, 20-100 mm, 20-70 mm, about 20 mm, and/or about 50 mm.

A40. The air diffuser of any of paragraphs A1-A39, wherein the interior of the outlet section at the outlet downstream end has a lateral width and a transverse breadth, wherein the lateral width is larger than the transverse breadth, and optionally wherein the ratio of the transverse breadth to the lateral width is less than 50%, less than 40%, less than 30%, less than 25%, less than 20%, less than 15%, less than 12%, less than 10%, less than 8%, less than 7%, less than 6%, less than 5%, less than 4%, 4-40%, 5-25%, 10-25%, about 25%, about 20%, about 15%, and/or about 12%.

A41. The air diffuser of any of paragraphs A1-A40, wherein a lateral width of the interior of the outlet section at the outlet downstream end is greater than 100 mm, greater than 200 mm, greater than 300 mm, greater than 400 mm, greater than 500 mm, less than 500 mm, less than 400 mm, less than 300 mm, less than 200 mm, 100-500 mm, 200-300 mm, and/or about 280 mm.

A42. The air diffuser of any of paragraphs A1-A41, wherein a transverse breadth of the interior of the outlet section at the outlet downstream end is greater than 10 mm, greater than 20 mm, greater than 30 mm, greater than 40 mm, greater than 50 mm, greater than 70 mm, greater than 100 mm, greater than 150 mm, less than 200 mm, less than 150 mm, less than 100 mm, less than 70 mm, less than 50 mm, less than 40 mm, less than 30 mm, less than 20 mm, 10-200 mm, 20-100 mm, 20-70 mm, about 20 mm, and/or about 50 mm.

A43. The air diffuser of any of paragraphs A1-A42, wherein a lateral width of the interior of the outlet section at the outlet downstream end is greater than a length of the/a outlet central axis, optionally wherein the ratio of the length to the lateral width is less than 80%, less than 60%, less than 50%, less than 40%, less than 30%, less than 25%, less than 20%, 20-80%, 25-60%, about 60%, about 50%, and/or about 40%.

A44. The air diffuser of any of paragraphs A1-A43, wherein the interior orifice plate is configured to restrict air flow from the inlet upstream end to one or more of the inlet downstream end, the neck downstream end, and the outlet downstream end.

A45. The air diffuser of any of paragraphs A1-A44, wherein the interior orifice plate is configured to create backpressure at the inlet upstream end.

A46. The air diffuser of any of paragraphs A1-A45, wherein the interior orifice plate is proximate to the inlet downstream end and proximate to the neck upstream end.

A47. The air diffuser of any of paragraphs A1-A46, wherein the interior orifice plate is operatively coupled to the inlet section and/or the neck section.

A48. The air diffuser of any of paragraphs A1-A47, wherein the interior orifice plate is within the interior of the inlet section or the neck section.

A49. The air diffuser of any of paragraphs A1-A48, wherein the interior orifice plate is substantially perpendicular to the/an inlet central axis.

A50. The air diffuser of any of paragraphs A1-A49, wherein the interior orifice plate is substantially perpendicular to the/a neck central axis.

A51. The air diffuser of any of paragraphs A1-A50, wherein the interior orifice plate defines a plurality of orifices, optionally greater than 5 orifices, greater than 10 orifices, greater than 20 orifices, greater than 30 orifices, 5-50 orifices, 10-30 orifices, less than 50 orifices, and/or less than 30 orifices.

A51.1. The air diffuser of paragraph A51, wherein at least one, optionally all, of the plurality of orifices are chamfered, and optionally wherein a chamfer of the at least one of the plurality of orifices faces the inlet upstream end.

A51.2. The air diffuser of any of paragraphs A51-A51.1, wherein at least one, optionally all, of the plurality of orifices has a non-uniform profile across a thickness of the interior orifice plate, optionally wherein an open area of the orifice facing the inlet upstream end is larger than an open area of the orifice facing the neck downstream end and/or the outlet downstream end.

A51.3. The air diffuser of any of paragraphs A51-A51.2, wherein each of the plurality of orifices has an area that is substantially the same.

A51.4. The air diffuser of any of paragraphs A51-A51.3, wherein at least one of the plurality of orifices has an area different from another of the plurality of orifices.

A52. The air diffuser of any of paragraphs A1-A51.4, wherein the open area of the interior orifice plate is less than 50%, less than 40%, less than 30%, less than 20%, less than 10%, greater than 5%, greater than 10%, greater than 20%, greater than 30%, 5-50%, and/or 20-40%.

A53. The air diffuser of any of paragraphs A1-A52, wherein a thickness of the interior orifice plate is less than 8 mm, less than 6 mm, less than 4 mm, less than 3 mm, less than 2 mm, greater than 1 mm, greater than 2 mm, greater than 3 mm, greater than 4 mm, 1-8 mm, and/or 2-4 mm.

A54. The air diffuser of any of paragraphs A1-A53, wherein a characteristic dimension of the interior orifice plate is greater than 30 mm, greater than 40 mm, greater than 50 mm, greater than 60 mm, greater than 80 mm, greater than 100 mm, less than 100 mm, less than 80 mm, less than 60 mm, less than 50 mm, 30-100 mm, and/or 40-60 mm, and wherein the characteristic dimension is a lateral width, a transverse breadth, a diameter, and/or an effective diameter.

A55. The air diffuser of any of paragraphs A1-A54, wherein the interior baffle is configured to restrict air flow from the neck upstream end to the outlet downstream end.

A56. The air diffuser of any of paragraphs A1-A55, wherein the interior baffle is configured to create backpressure at the neck upstream end.

A57. The air diffuser of any of paragraphs A1-A56, wherein the interior baffle is configured to spread air flow across a lateral width of the interior of the outlet downstream end.

A58. The air diffuser of any of paragraphs A1-A57, wherein the interior baffle is configured to create a tortuous air flow path within the air diffuser.

A59. The air diffuser of any of paragraphs A1-A58, wherein the interior baffle is configured to prevent direct transmission of upstream noise.

A60. The air diffuser of any of paragraphs A1-A59, wherein the interior baffle is configured to redirect air flow to interact with the interior of the neck section, the interior of the outlet section, the/a neck sound dampening material, and/or the/a outlet sound dampening material.

A61. The air diffuser of any of paragraphs A1-A60, wherein the interior baffle is proximate to the neck downstream end and proximate to the outlet upstream end.

A62. The air diffuser of any of paragraphs A1-A61, wherein the interior baffle is operatively coupled to the neck section and/or the outlet section.

A63. The air diffuser of any of paragraphs A1-A62, wherein the interior baffle is substantially perpendicular to or oblique to, the/a neck central axis, optionally wherein an angle between the interior baffle and the neck central axis is greater than 10°, greater than 15°, greater than 20°, greater than 25°, greater than 30°, greater than 35°, greater than 40°, greater than 45°, greater than 50°, greater than 55°, greater than 60°, greater than 65°, greater than 70°, greater than 75°, greater than 85°, less than 90°, less than 75°, less than 70°, less than 65°, less than 60°, less than 55°, less than 50°, less than 45°, less than 40°, less than 35°, less than 30°, less than 25°, less than 20°, less than 15°, 10°-50°, 15°-45°, 20°-45°, 25°-35°, about 90°, about 75°, about 60°, about 45°, about 30°, and/or about 15°.

A64. The air diffuser of any of paragraphs A1-A63, wherein the interior baffle is substantially perpendicular to or oblique to, the/an outlet central axis, optionally wherein an angle between the interior baffle and the outlet central axis is greater than 10°, greater than 15°, greater than 20°, greater than 25°, greater than 30°, greater than 35°, greater than 40°, greater than 45°, greater than 50°, greater than 55°, greater than 60°, greater than 65°, greater than 70°, greater than 75°, greater than 85°, less than 90°, less than 75°, less than 70°, less than 65°, less than 60°, less than 55°, less than 50°, less than 45°, less than 40°, less than 35°, less than 30°, less than 25°, less than 20°, less than 15°, 10°-50°, 15°-45°, 20°-45°, 25°-35°, about 90°, about 75°, about 60°, about 45°, about 30°, and/or about 15°.

A65. The air diffuser of any of paragraphs A1-A64, wherein the interior baffle is a baffle plate with a first end and a second end.

A65.1. The air diffuser of paragraph A65, wherein the baffle plate is substantially flat.

A65.2. The air diffuser of any of paragraphs A65-A65.1, wherein the baffle plate substantially spans a lateral width of the interior of the neck section and/or a lateral width of the interior of the outlet section.

A65.3. The air diffuser of any of paragraphs A65-A65.2, wherein the baffle plate is configured to substantially restrict air flow near the first end and/or the second end.

A65.4. The air diffuser of any of paragraphs A65-A65.3, wherein, when the neck section includes neck sound dampening material, the neck sound dampening material defines a material gap near the first end of the baffle plate and/or near the second end of the baffle plate.

A65.5. The air diffuser of any of paragraphs A65-A65.4, wherein, when the outlet section includes outlet sound dampening material, the outlet sound dampening material defines a material gap near the first end of the baffle plate and/or near the second end of the baffle plate.

A65.6. The air diffuser of any of paragraphs A65-A65.5, wherein the baffle plate defines a gap, optionally one gap, in the interior of the neck section and/or the interior of the outlet section.

A65.6.1. The air diffuser of paragraph A65.6, wherein the gap substantially spans a lateral width of the interior of the neck section and/or a lateral width of the interior of the outlet section.

A65.6.2. The air diffuser of any of paragraphs A65.6-A65.6.1, wherein the gap has an open area that is less than 50%, less than 40%, less than 35%, less than 30%, less than 25%, less than 20%, less than 15%, less than 12%, less than 10%, less than 8%, greater than 5%, greater than 8%, greater than 10%, greater than 12%, greater than 15%, greater than 20%, greater than 25%, greater than 30%, greater than 35%, greater than 40%, 5-50%, 8-30%, 8-20%, 10-35%, about 8%, about 10%, about 12%, about 15%, about 20%, about 25%, about 30%, and/or about 33% of the open area of the outlet downstream end.

A65.6.3. The air diffuser of any of paragraphs A65.6-A65.6.2, wherein the gap is proximate to an interior surface of the neck section and/or an interior surface of the outlet section, optionally wherein the interior surface of the neck section and/or the interior surface of the outlet section is substantially flat near the gap, has a curvature away from the baffle plate, and/or has a curvature toward the baffle plate.

A65.6.4. The air diffuser of any of paragraphs A65.6-A65.6.3, wherein the baffle plate has a third end near the gap and a fourth end opposite the third end, wherein the third end is upstream or downstream of the fourth end.

A65.6.5. The air diffuser of any of paragraphs A65.6-A65.6.4, wherein the baffle plate has a third end near the gap that is configured to smoothly split air flow.

A65.6.6. The air diffuser of any of paragraphs A65.6-A65.6.5, wherein the baffle plate has a third end near the gap that is wedge-shaped, rounded and/or bulbous.

A66. The air diffuser of any of paragraphs A1-A65.6.6, wherein the interior baffle is a flow straightener plate with one or more rows of apertures, optionally one or three rows, wherein each aperture has a characteristic dimension, optionally wherein the characteristic dimension is a lateral width, a transverse breadth, a diameter, and/or an effective diameter.

A66.1. The air diffuser of paragraph A66, wherein all apertures have essentially the same characteristic dimension.

A66.2. The air diffuser of any of paragraphs A66-A66.1, wherein the apertures each independently traverse the flow straightener plate at an angle that is perpendicular to or oblique to a local plane of the flow straightener plate proximate to the aperture, optionally wherein the angle is about 90°, about 75°, about 60°, about 45°, about 30°, or about 15°, and optionally wherein the apertures of a row all traverse the flow straightener plate at essentially the angle.

A67. The air diffuser of any of paragraphs A1-A66.2, wherein the air diffuser is configured to flow air at greater than 700 g/min, greater than 800 g/min, greater than 900 g/min, greater than 1,000 g/min, greater than 1,100 g/min, greater than 1,200 g/min, less than 1,500 g/min, less than 1,200 g/min, 800-1,200 g/min, greater than 800 l/min, greater than 900 l/min, greater than 1,000 l/min, greater than 1,100 l/min, greater than 1,200 l/min, greater than 1,300 l/min, less than 1,500 l/min, less than 1,300 l/min, and/or 900-1,300 l/min.

A68. The air diffuser of any of paragraphs A1-A67, wherein the air diffuser is configured to generate a sound level that is less than 20 dB, less than 10 dB, less than 5 dB, less than 3 dB, less than 2 dB, or less than 1 dB more than ambient aircraft cabin noise when air flows through the inlet section to the outlet section, and optionally wherein the sound level includes the sound level at frequencies of 1 kHz, 2 kHz, 3 kHz, 4 kHz, 5 kHz, 8 kHz, 10 kHz, 12 kHz, 15 kHz, 20 kHz, 1-4 kHz, 2-4 kHz, 3-10 kHz, 5-10 kHz, greater than 5 kHz, and/or greater than 8 kHz.

A69. The air diffuser of any of paragraphs A1-A68, wherein the air diffuser is configured to generate a speech interference level of less than 55 dB, less than 52 dB, less than 50 dB, less than 48 dB, less than 46 dB, or less than 44 dB when air flows through the inlet section to the outlet section.

A70. A quiet aircraft air conditioning system comprising:
the quiet aircraft cabin air diffuser of any of paragraphs A1-A69;
wherein the quiet aircraft air conditioning system is configured to supply air through the quiet aircraft cabin air diffuser.

A71. An aircraft comprising a plurality of the quiet aircraft cabin air diffusers of any of paragraphs A1-A69.

A71.1. The aircraft of paragraph A71, wherein the aircraft includes less than one quiet aircraft cabin air diffuser for every two rated occupants, for every three rated occupants, and/or for every four rated occupants, and optionally wherein the aircraft includes less than 0.5, less than 0.4, less than 0.37, less than 0.33, less than 0.30, less than 0.28, less than 0.26, less than 0.24, less than 0.22, less than 0.2, about 0.4, about 0.37, about 0.33, about 0.3, about 0.25, and/or about 0.22 air diffusers per rated occupant.

A71.2. The aircraft of any of paragraphs A71-A71.1, wherein the aircraft is configured to maintain an aircraft cabin pressure of greater than about 60 kPa, greater than 70 kPa, greater than 75 kPa, greater than 80 kPa, greater than 90 kPa, greater than 100 kPa, less than 120 kPa, less than 100 kPa, less than 80 kPa, 70-80 kPa, 70-90 kPa, about 80 kPa, and/or about 75 kPa.

B1. A method of supplying air to an aircraft cabin, comprising:
supplying air through the quiet aircraft cabin air diffuser of any of paragraphs A1-A69.

B2. The method of paragraph B1, wherein the supplying includes supplying while the aircraft is in flight.

B3. The method of any of paragraphs B1-B2, wherein the supplying includes flowing air through the quiet aircraft cabin air diffuser at greater than 700 g/min, greater than 800 g/min, greater than 900 g/min, greater than 1,000 g/min, greater than 1,100 g/min, greater than 1,200 g/min, less than 1,500 g/min, less than 1,200 g/min, 800-1,200 g/min, greater than 800 l/min, greater than 900 l/min, greater than 1,000 l/min, greater than 1,100 l/min, greater than 1,200 l/min, greater than 1,300 l/min, less than 1,500 l/min, less than 1,300 l/min, and/or 900-1,300 l/min.

B4. The method of any of paragraphs B1-B3, wherein the supplying includes supplying with a sound level less than 20 dB, less than 10 dB, less than 5 dB, less than 3 dB, less than 2 dB, or less than 1 dB more than ambient aircraft cabin noise, and optionally wherein the sound level includes frequencies of 1 kHz, 2 kHz, 3 kHz, 4 kHz, 5 kHz, 8 kHz, 10 kHz, 12 kHz, 15 kHz, 20 kHz, 1-4 kHz, 2-4 kHz, 3-10 kHz, 5-10 kHz, greater than 5 kHz, and/or greater than 8 kHz.

B5. The method of any of paragraphs B1-B4, wherein the supplying includes supplying with a speech interference level less than 55 dB, less than 52 dB, less than 50 dB, less than 48 dB, less than 46 dB, or less than 44 dB.

B6. The method of any of paragraphs B1-B5, wherein the aircraft cabin includes occupants, and wherein the supplying includes using less than one quiet aircraft cabin air diffuser for every two occupants, for every three occupants, and/or for every four occupants, and optionally wherein the aircraft includes less than 0.5, less than 0.4, less than 0.37, less than 0.33, less than 0.30, less than 0.28, less than 0.26, less than 0.24, less than 0.22, less than 0.2, about 0.4, about 0.37, about 0.33, about 0.3, about 0.25, and/or about 0.22 air diffusers per rated occupant.

B7. The method of any of paragraphs B1-B6, further comprising:
maintaining a pressure in the aircraft cabin of greater than about 60 kPa, greater than 70 kPa, greater than 75 kPa, greater than 80 kPa, greater than 90 kPa, greater than 100 kPa, less than 120 kPa, less than 100 kPa, less than 80 kPa, 70-80 kPa, 70-90 kPa, about 80 kPa, and/or about 75 kPa.

As used herein, the terms "selective" and "selectively," when modifying an action, movement, configuration, or other activity of one or more components or characteristics of an apparatus, mean that the specific action, movement, configuration, or other activity is a direct or indirect result of user manipulation of an aspect of, or one or more components of, the apparatus.

As used herein, the terms "adapted" and "configured" mean that the element, component, or other subject matter is designed and/or intended to perform a given function. Thus, the use of the terms "adapted" and "configured" should not be construed to mean that a given element, component, or other subject matter is simply "capable of" performing a given function but that the element, component, and/or other subject matter is specifically selected, created, implemented, utilized, programmed, and/or designed for the purpose of performing the function. It is also within the scope of the present disclosure that elements, components, and/or other recited subject matter that is recited as being adapted to perform a particular function may additionally or alternatively be described as being configured to perform that function, and vice versa. Similarly, subject matter that is recited as being configured to perform a particular function may additionally or alternatively be described as being operative to perform that function.

The various disclosed elements of apparatuses and steps of methods disclosed herein are not required to all apparatuses and methods according to the present disclosure, and the present disclosure includes all novel and non-obvious combinations and subcombinations of the various elements and steps disclosed herein. Moreover, one or more of the various elements and steps disclosed herein may define independent inventive subject matter that is separate and apart from the whole of a disclosed apparatus or method. Accordingly, such inventive subject matter is not required to be associated with the specific apparatuses and methods that are expressly disclosed herein, and such inventive subject matter may find utility in apparatuses and/or methods that are not expressly disclosed herein.

The invention claimed is:

1. A quiet aircraft cabin air diffuser comprising:
   an inlet section with an open interior, an inlet upstream end, and an inlet downstream end;
   a neck section with an open interior, a neck upstream end, and a neck downstream end, wherein the inlet downstream end is operatively coupled to the neck upstream end;
   an outlet section with an open interior, an outlet upstream end and an outlet downstream end, wherein the neck downstream end is operatively coupled to the outlet upstream end;
   an interior orifice plate at the inlet downstream end, wherein the interior orifice plate has an effective diameter of greater than 30 mm; and
   an interior baffle that is downstream of the interior orifice plate;
   wherein the air diffuser is configured to generate a speech interference level of less than 50 dB when air flows through the inlet section to the outlet section at a rate of greater than 700 g/min (grams per minute).

2. The air diffuser of claim 1, wherein the interior orifice plate is configured to create backpressure at the inlet upstream end.

3. The air diffuser of claim 1, wherein the interior baffle is configured to create a tortuous air flow path within the air diffuser.

4. The air diffuser of claim 1, wherein the interior baffle is configured to spread air flow across a lateral width of the interior of the outlet downstream end.

5. The air diffuser of claim 1, wherein the neck section has a transition region between the neck upstream end and the neck downstream end, wherein the transition region has a non-uniform interior profile that defines a smooth air flow path.

6. A quiet aircraft cabin air diffuser comprising:
   an inlet section with an open interior, an inlet upstream end, and an inlet downstream end, wherein the open interior of the inlet section defines an inlet air flow path that is substantially diverging;
   a neck section with an open interior, a neck upstream end, and a neck downstream end, wherein the inlet downstream end is operatively coupled to the neck upstream end;
   an outlet section with an open interior, an outlet upstream end and an outlet downstream end, wherein the neck downstream end is operatively coupled to the outlet upstream end;
   an interior orifice plate at the inlet downstream end; and
   an interior baffle plate that is downstream of the interior orifice plate, wherein the baffle plate defines a gap in the interior of the outlet section and is configured to prevent direct transmission of upstream noise.

7. The air diffuser of claim 6, wherein the neck section includes a neck sound dampening material.

8. The air diffuser of claim 7, wherein the interior of the neck section at the neck downstream end has a lateral surface and a transverse surface, wherein the lateral surface is substantially covered by neck sound dampening material, and wherein the transverse surface is substantially free of neck sound dampening material.

9. The air diffuser of claim 6, wherein the outlet section includes an outlet sound dampening material.

10. The air diffuser of claim 9, wherein the interior of the outlet section at the outlet upstream end has a lateral surface and a transverse surface, wherein the lateral surface is substantially covered by outlet sound dampening material, and wherein the transverse surface is substantially free of outlet sound dampening material.

11. The air diffuser of claim 6, wherein the interior orifice plate defines a plurality of chamfered orifices, wherein a chamfer of the plurality of chamfered orifices faces the inlet upstream end.

12. The air diffuser of claim 6, wherein the interior baffle plate is substantially oblique to a neck central axis, wherein an angle between the interior baffle plate and the neck central axis is 25°-35°.

13. The air diffuser of claim 6, wherein the interior baffle plate substantially spans a lateral width of the interior of the outlet section.

14. The air diffuser of claim 6, wherein the gap substantially spans a lateral width of the interior of the outlet section.

15. The air diffuser of claim 6, wherein the outlet section has an interior profile at the outlet downstream end that is substantially oblong.

16. The air diffuser of claim 6, wherein the interior of the outlet section defines a substantially curved air flow path, and wherein a plane of principal curvature of the air flow path is substantially orthogonal to a lateral width of the interior of the outlet section at the outlet upstream end.

17. An aircraft comprising a plurality of quiet aircraft cabin air diffusers, wherein each of the air diffusers include:
   an inlet section with an open interior, an inlet upstream end, and an inlet downstream end;
   a neck section with an open interior, a neck upstream end, and a neck downstream end, wherein the inlet downstream end is operatively coupled to the neck upstream end;
   an outlet section with an open interior, an outlet upstream end and an outlet downstream end, wherein the neck downstream end is operatively coupled to the outlet upstream end;
   an interior orifice plate at the inlet downstream end; and
   an interior baffle plate that is downstream of the interior orifice plate, wherein the baffle plate defines a gap in the interior of the outlet section and is configured to prevent direct transmission of upstream noise;
   wherein the air diffusers are configured to flow air at a rate of greater than 700 g/min with a speech interference level less than 50 dB.

18. The aircraft of claim 17, wherein the aircraft includes less than 0.4 air diffusers per rated occupant.

19. The aircraft of claim 17, wherein the aircraft is configured to maintain an aircraft cabin pressure of 70-90 kPa.

20. A quiet aircraft cabin air diffuser comprising:
   an inlet section with an open interior, an inlet upstream end, and an inlet downstream end;
   a neck section with an open interior, a neck upstream end, and a neck downstream end, wherein the inlet downstream end is operatively coupled to the neck upstream end;
   an outlet section with an open interior, an outlet upstream end and an outlet downstream end, wherein the neck downstream end is operatively coupled to the outlet upstream end;
   an interior orifice plate at the inlet downstream end; and
   an interior baffle plate that is downstream of the interior orifice plate, wherein the baffle plate defines a gap in the interior of the outlet section and is configured to prevent direct transmission of upstream noise;

wherein the interior of the outlet section defines a substantially curved air flow path, and wherein a plane of principal curvature of the air flow path is substantially orthogonal to a lateral width of the interior of the outlet section at the outlet upstream end.

21. The air diffuser of claim 20, wherein the outlet section includes an outlet sound dampening material.

22. The air diffuser of claim 21, wherein the interior of the outlet section at the outlet upstream end has a lateral surface and a transverse surface, wherein the lateral surface is substantially covered by outlet sound dampening material, and wherein the transverse surface is substantially free of outlet sound dampening material.

23. The air diffuser of claim 20, wherein the interior orifice plate defines a plurality of chamfered orifices, wherein a chamfer of the plurality of chamfered orifices faces the inlet upstream end.

24. The air diffuser of claim 20, wherein the interior baffle plate is substantially oblique to a neck central axis, wherein an angle between the interior baffle plate and the neck central axis is 25°-35°.

* * * * *